(12) United States Patent
Jain et al.

(10) Patent No.: US 12,018,429 B2
(45) Date of Patent: *Jun. 25, 2024

(54) LAUNDRY APPARATUS

(71) Applicant: LAUNDRYSUCKS.IO Inc., Lafayette, IN (US)

(72) Inventors: Nishant Jain, Atlanta, GA (US); Thibault P. Corens, Hamme (BE); Keith Li, Hong Kong (CN)

(73) Assignee: LAUNDRYSUCKS.IO Inc., Sandy Springs, GA (US)

( * ) Notice: Subject to any disclaimer, the term of this patent is extended or adjusted under 35 U.S.C. 154(b) by 410 days.

This patent is subject to a terminal disclaimer.

(21) Appl. No.: 17/258,531

(22) PCT Filed: Aug. 3, 2019

(86) PCT No.: PCT/US2019/045019
§ 371 (c)(1),
(2) Date: Jan. 7, 2021

(87) PCT Pub. No.: WO2020/033274
PCT Pub. Date: Feb. 13, 2020

(65) Prior Publication Data
US 2021/0230789 A1 Jul. 29, 2021

Related U.S. Application Data

(60) Provisional application No. 62/714,731, filed on Aug. 5, 2018.

(51) Int. Cl.
*D06F 58/10* (2006.01)
*B25J 17/02* (2006.01)
(Continued)

(52) U.S. Cl.
CPC .......... *D06F 73/02* (2013.01); *B25J 17/0258* (2013.01); *D06F 34/18* (2020.02); *D06F 39/40* (2024.01);
(Continued)

(58) Field of Classification Search
CPC .. B25J 17/0258; D06F 39/008; D06F 58/203; D06F 34/18; D06F 73/02; D06F 58/10; D06F 2103/02; D06F 39/40; G06F 18/214
See application file for complete search history.

(56) References Cited

U.S. PATENT DOCUMENTS 3,583,610 A 6/1971 Forse
3,707,855 A 1/1973 Buckley
(Continued)

FOREIGN PATENT DOCUMENTS

EP 0470509 A1 2/1992

OTHER PUBLICATIONS

International Search Report & Written Opinion mailed Nov. 19, 2019 in International Pat. Appl. No. PCT/US2019/045019.

*Primary Examiner* — Benjamin L Osterhout
(74) *Attorney, Agent, or Firm* — Run8 Patent Group, LLC; Peter Miller

(57) ABSTRACT

A laundry apparatus contains a steamer for providing steam, a first unit for blowing the steam towards a fabric and a second unit for blowing a hot gaseous matter towards the fabric, wherein the hot gaseous matter is formed by heating the gaseous matter also with the steam. An apparatus for removing wrinkles from garments contains a hanger for hanging a garment, a steam tube to blow steam into a sleeve of the garment, and an expandable component underneath the shoulder. The expandable component is in a compact state when the sleeve of the garment is initially hung from
(Continued)

the shoulder, and in an expanded state to close the passage between the sleeve and a torso of the garment, wherein the steam blocked by the expandable component operates to remove wrinkles in the sleeve.

20 Claims, 14 Drawing Sheets

(51) Int. Cl.
  *D06F 34/18* (2020.01)
  *D06F 39/00* (2024.01)
  *D06F 39/40* (2024.01)
  *D06F 58/20* (2006.01)
  *D06F 73/02* (2006.01)
  *D06F 103/02* (2020.01)
  *G06F 18/214* (2023.01)

(52) U.S. Cl.
  CPC ............ *D06F 58/10* (2013.01); *D06F 58/203* (2013.01); *D06F 2103/02* (2020.02); *G06F 18/214* (2023.01)

(56) References Cited

U.S. PATENT DOCUMENTS

| | | | |
|---|---|---|---|
| 4,199,088 A | 4/1980 | Sanko | |
| 4,728,015 A * | 3/1988 | Holzapfel | D06F 73/00 223/70 |
| 4,980,981 A * | 1/1991 | Naidoo | D06F 69/00 38/144 |
| 5,305,484 A * | 4/1994 | Fitzpatrick | D06F 73/02 68/6 |
| 5,609,047 A * | 3/1997 | Hellman, Jr. | D06F 73/00 68/222 |
| 5,815,961 A * | 10/1998 | Estes | D06F 73/02 38/14 |
| 8,464,562 B1 * | 6/2013 | Colburn | D06F 73/02 68/222 |
| 2004/0112095 A1 * | 6/2004 | Bolduan | D06F 58/10 68/184 |
| 2005/0115120 A1 * | 6/2005 | Cevik | D06F 73/02 38/14 |
| 2005/0132761 A1 * | 6/2005 | Carrubba | D06F 73/00 68/222 |
| 2007/0006484 A1 | 1/2007 | Moschuetz et al. | |
| 2008/0217364 A1 * | 9/2008 | Fong | D06F 59/02 223/89 |
| 2008/0256989 A1 * | 10/2008 | Jeong | D06F 73/02 392/441 |
| 2010/0012689 A1 * | 1/2010 | Guffey | A47G 25/20 223/66 |
| 2010/0251779 A1 * | 10/2010 | Zaglio | A47G 25/20 68/13 R |
| 2011/0030249 A1 * | 2/2011 | Rosenzweig | D06F 73/00 38/144 |
| 2012/0018461 A1 * | 1/2012 | Azizian | D06F 73/02 223/66 |
| 2012/0159806 A1 * | 6/2012 | Dana | D06F 58/203 68/6 |
| 2012/0317729 A1 * | 12/2012 | Song | D06F 58/10 68/6 |
| 2013/0193171 A1 * | 8/2013 | Carter | D06F 75/12 68/5 R |
| 2014/0223973 A1 | 8/2014 | Alrefaei | |
| 2016/0215440 A1 * | 7/2016 | Burger | D06F 73/02 |
| 2017/0268156 A1 * | 9/2017 | Dana | D06F 59/02 |
| 2019/0257024 A1 * | 8/2019 | Shin | F24F 11/00 |
| 2020/0370236 A1 * | 11/2020 | Chae | D06F 73/00 |
| 2021/0032797 A1 * | 2/2021 | Shin | D06F 58/10 |

* cited by examiner

LAUNDRY APPARATUS

PRIORITY CLAIM

The instant patent application is related to and claims priority from the U.S. Provisional Patent Application entitled "SYSTEM FOR REMOVING BACTERIA, ODOR, AND WRINKLES FROM LINEN MATERIAL", Ser. No. 62/714,731, filed 5 Aug. 2018, and incorporated by reference in its entirety herein.

BACKGROUND OF THE DISCLOSURE

Technical Field

The present disclosure relates to a Laundry Apparatus.

RELATED ART

Laundry, as used in the instant application, refers to an apparatus used for laundering objects such as garments and linen. Laundering generally entails washing and/or cleaning, depending on the object sought to be laundered, as is well known in the relevant arts. Laundry apparatus is also normally used for drying and pressing (ironing) of garments.

Aspects of the present disclosure relate to laundry apparatus.

BRIEF DESCRIPTION OF THE DRAWINGS

Example embodiments of the present disclosure will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

According to an aspect of the present disclosure, a laundry apparatus is disclosed. The laundry apparatus contains a steamer for providing steam, a first unit for blowing the steam towards a fabric and a second unit for blowing a hot gaseous matter towards the fabric, wherein the hot gaseous matter is formed by heating the gaseous matter also with the steam.

In an embodiment, the fabric is a garment having a sleeve, the gaseous matter is air, and the first unit is an ironing unit for removing wrinkles on the garment by blowing steam towards the garment, and the second unit is a dryer for drying the garment by blowing hot air towards the garment.

According to another aspect of the present disclosure, an apparatus for removing wrinkles from garments is disclosed. The apparatus for removing wrinkles contains a connector for a hanger, where the hanger is for hanging a garment and the hanger has a shoulder. The apparatus also contains a steam tube to blow steam into a sleeve of the garment, and an expandable component underneath the shoulder, where the expandable component is in a compact state when the sleeve of the garment is initially hung from the shoulder. The apparatus further contains an actuator to cause the expandable component to expand to an expanded state thereby closing the passage between the sleeve and a torso of the garment, wherein the steam blocked by the expandable component operates to remove wrinkles in the sleeve.

In an example embodiment, the actuator causes the expandable component to expand to the expanded state by infusing a fluid (e.g., air) into the expandable component.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

Figure 1A:
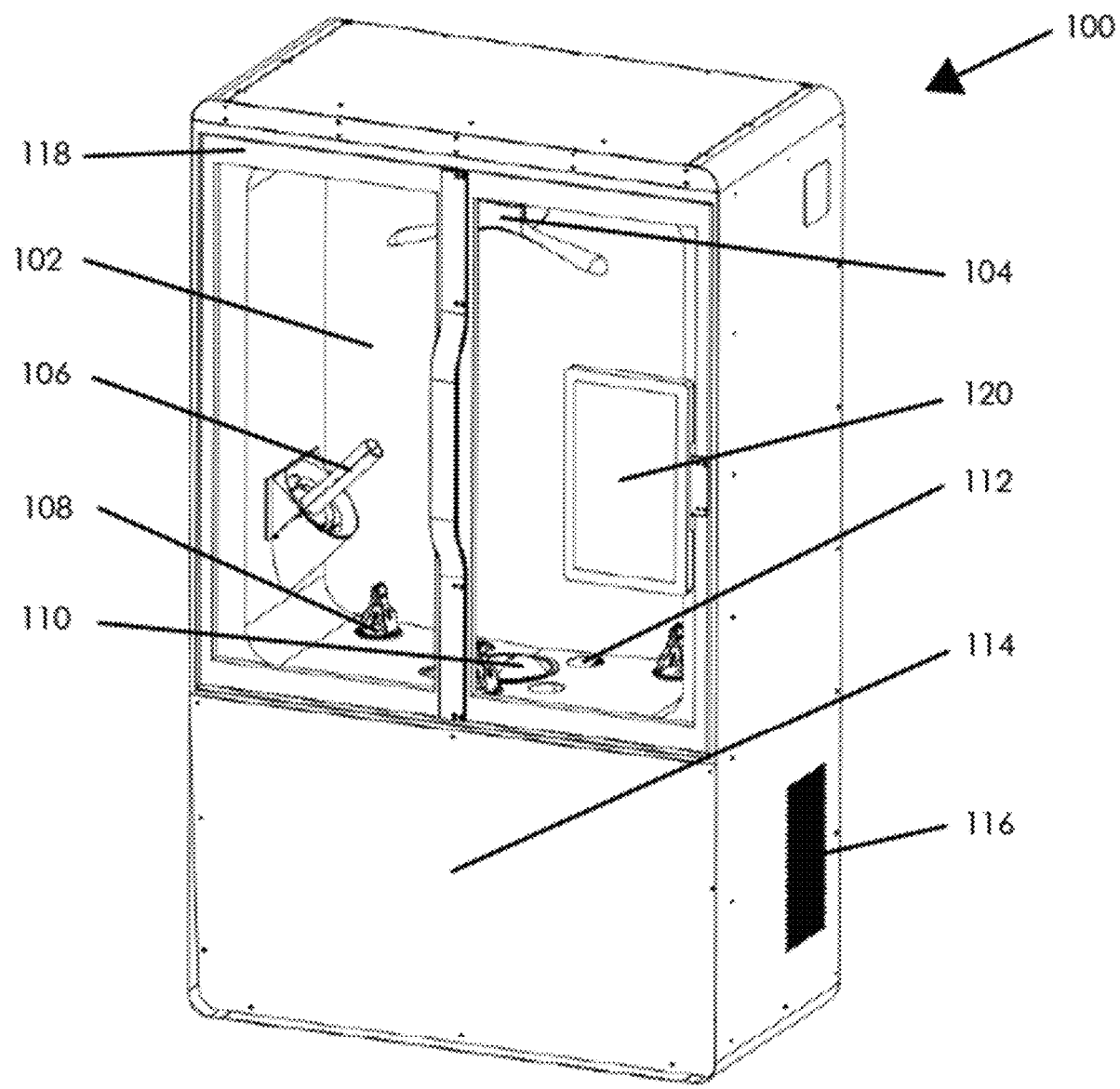
FIG. 1A is a schematic diagram illustrating an example laundry apparatus in an embodiment of the present disclosure.

FIG. 1A is a schematic diagram illustrating an example laundry apparatus 100 in an embodiment of the present disclosure. Laundry apparatus 100 is shown containing steam chamber 102, hanger 104, sleeve grabber 106, clips 108, steam nozzle 110, dryer nozzles 112, steam generator assembly 114, air inlet 116, door 118 and user interface 120.

Steam chamber 102 is an enclosed space in which garments are subjected to various laundering processes. Steam chamber 102 contains door 118 for preventing the liquids and gases that may be used in the laundering processes from escaping out of steam chamber 102.

Hanger 104 facilitates hanging of the garments that are to be subjected to the laundering processes.

Sleeve grabber 106 holds/grabs sleeves of the garments during the laundering processes. Sleeve grabber 106 may also facilitate untwisting of the sleeves of the garments. In an example embodiment, sleeve grabber 106 also contains mechanisms for directing the liquids and gases used in the laundering processes into the sleeves of the garments.

Though only one sleeve grabber 106 is shown in FIG. 1, laundry apparatus 100 typically contains two sleeve grabbers 106, one for each sleeve.

Clips 108 are used for clipping the garments at various parts. Clips 108 may be connected to retractable cables that pull the clips downwards. When clips 108 connected to the retractable cables are attached to the garments, the retractable cables pull the garments attached to clips 108 downwards thereby stretching the garments. The stretching may result in reduced wrinkles and better application of laundering processes.

Steam nozzle 110 is used for directing steam, or other gases and liquids used in laundering processes towards various parts of the garments. In an example embodiment, steam nozzle 110 is used to direct steam towards torso of the garments.

Dryer nozzles 112 are used for blowing gases (gaseous matter) for drying the garments. In an example embodiment, dryer nozzles 112 blow hot air towards the garments for drying the garments. However, any other gases may be used for drying purposes.

Steam generator assembly 114 includes a steamer for generating the steam. The steamer may contain a boiler for generating the steam by boiling water. Steam generator assembly 114 may also contain heat exchangers, plumbing materials, steam valves, liquid reservoirs and electrical/electronic/mechanical circuitry to control the constituents of steam generator assembly 114.

Air inlet 116 provides the air required by steam generator assembly 114 for various laundering processes. Air inlet 116 may use various air filters for removing solid particulates such as dust, pollen, mold, bacteria etc. from the air. In an example embodiment, air inlet 116 uses High Efficiency Particulate Air (HEPA) filters for removing particulates from the air.

User interface 120 provides a means for controlling various laundering processes and constituents of laundry apparatus 100. In an example embodiment, user interface 120 is a touchscreen user interface.

Though not shown in FIG. 1A, laundry apparatus 100 may also contain mechanisms to remove liquid droplets (for example, water droplets formed out of condensation of steam) that are formed on various parts of laundry apparatus 100 during laundering processes.

Also, though not shown in FIG. 1A, laundry apparatus 100 may contain various feedback circuits (for example, for controlling temperature of steam, temperature of air blown through dryer nozzles, quantity of steam, humidity/moisture in steam chamber 102 etc.).

Furthermore, laundry apparatus 100 may contain various mechanisms to direct the steam in steam chamber 102 back to the steamer in steam generator assembly 114 (for example, when steam chamber 102 has excess steam than required or when the ironing process is complete).

In an example embodiment, laundry apparatus 100 is in the form a kiosk that is portable.

Figure 1B:
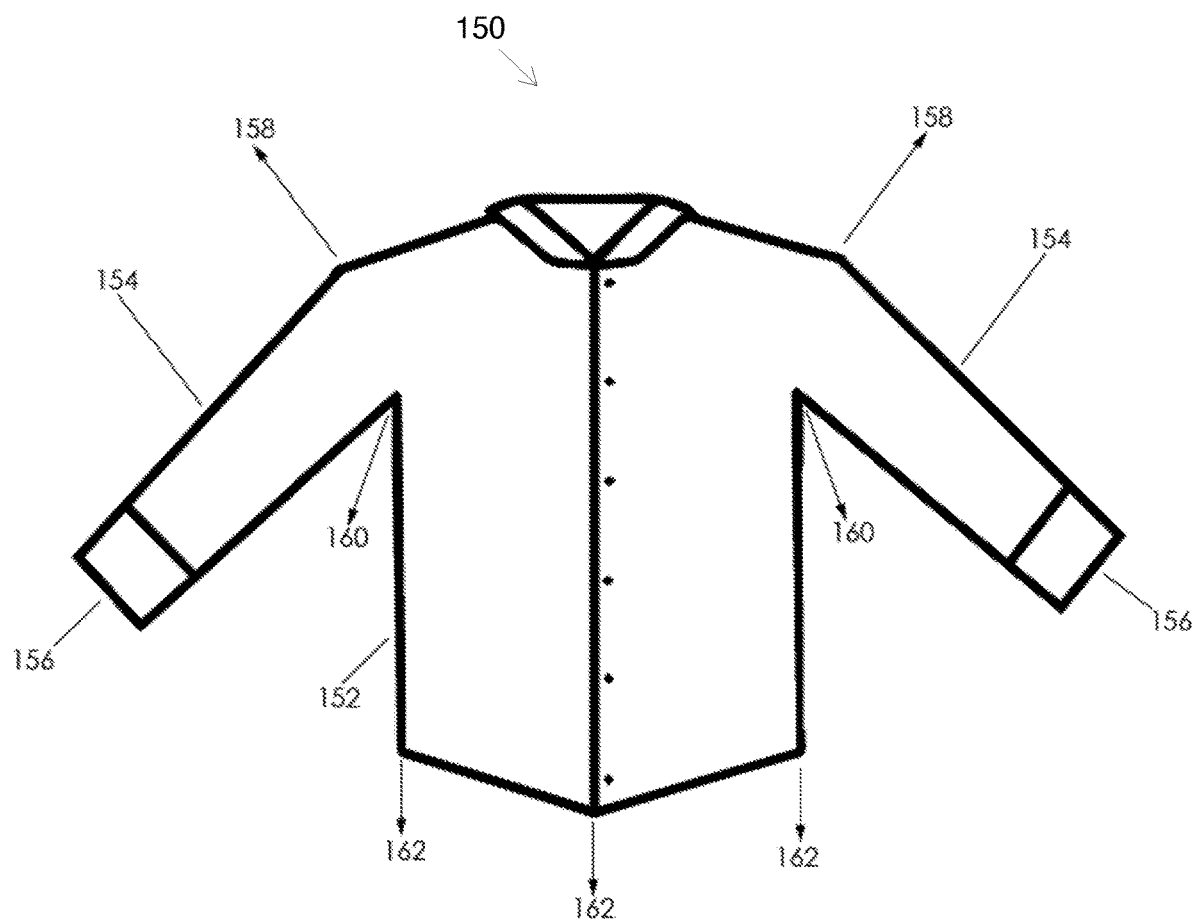
FIG. 1B depicts various parts of a garment in an example embodiment.

FIG. 1B depicts various parts of a garment 150 in an example embodiment. The garment 150 is shown containing torso 152, sleeves 154, sleeve edges 156, shoulders 158, underarms 160, seams 162, which have well known meanings in the relevant arts.

3. Functional Diagram

Figure 2:
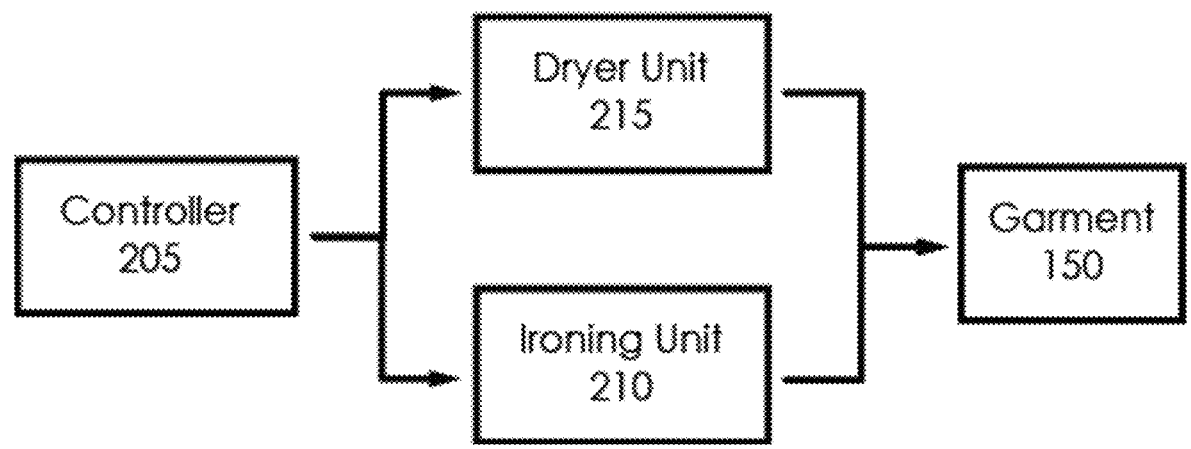
FIG. 2 illustrates a functional diagram of laundry apparatus in an example implementation.

FIG. 2 illustrates a functional diagram of laundry apparatus 100. FIG. 2 is shown containing a controller 205, ironing unit 210, drying unit 215, and garment 150 that is to be subjected to various laundering processes.

Ironing unit 210 removes wrinkles on garment 150 by blowing steam towards garment 150. The steam blown on garment 150 can operate to clean and/or iron garment 150, as explained in detail below. Ironing unit 210 may comprise steam nozzle 110 and sleeve grabber 106. The steam is blown towards garment 150 using steam nozzle 110 and sleeve grabber 106, where steam nozzle 110 generally directs the steam at torso 152 of garment 150 (can also be directed at other parts of garment 150) and sleeve grabber grabs/holds sleeves 154 at sleeve edges 156 and directs steam into sleeves 154 of garment 150.

As the steam is blown, the steam fills steam chamber 102 and the temperature of garment 150 rises to above 60 degrees Celsius leading to killing of bacteria. The steam also deodorizes garment 150 by neutralizing smelly chemical compounds. Also, the heat and moisture from the steam resets the hydrogen bonds in the fabric that form the wrinkles into the new stretched positions, thereby rendering the garment wrinkle-free.

In addition to the steam, cleaning liquid (typically disinfectants, scented liquids, detergent, and deodorizers) may also be sprayed on garment 150 (especially the underarms) through steam nozzle 110 and sleeve grabber 106 or the same may be infused into the steam. In case of infusion with steam, the infusion may be achieved with the help of a mechanism (for example, using peristaltic pump) that pumps the cleaning liquid into the steam pipe close to steam nozzle 110 or sleeve grabber 106. Peristaltic pump enables precise control of the cleaning liquid infused into the steam. As the steam exits the steam nozzle 110, it atomizes and sprays the cleaning liquid on garment 150. It is important to infuse cleaning liquid close to nozzle to prevent burning of the liquid due to high temperature of steam and clogging caused by the cleaning liquid residue in the steam tubing.

The moisture created by the steam also results in cleaning of garment 150. The steam makes garment 150 slightly damp, which is typically sufficient to provide a semi-immersive environment for the cleaning liquid to act on the sweat, smell, and bacteria.

Drying unit 215 facilitates drying of garment 150 by blowing hot gases towards garment 150. The hot gas is formed by heating the gas with/using the steam obtained from the steamer meant of providing steam for ironing. Thus, ironing unit 210 and drying unit 215 both obtain the steam required for their operation from the same steamer. Drying unit 215 may comprise dryer nozzles 112, the heat exchanger and the fan (described below with respect to FIG. 5). In an example embodiment, the gas heated by drying unit 215 (in particular, the heat exchanger) is air.

Controller 205 facilitates controlling of ironing unit 210 and drying unit 215. Controller 205 may comprise one or more processors and a memory. Controller 205 may perform the controlling operations based on the instructions stored in the memory.

Though not shown in the FIGURES, laundry apparatus 100 may include various feedback mechanisms, and controller 205 may receive feedback signals from the feedback mechanisms and may control the functioning/operations of ironing unit 210 and drying unit 215 based on the feedback signals.

The description is continued below with respect to hanger 104.

4. Hanger

Figure 3A:
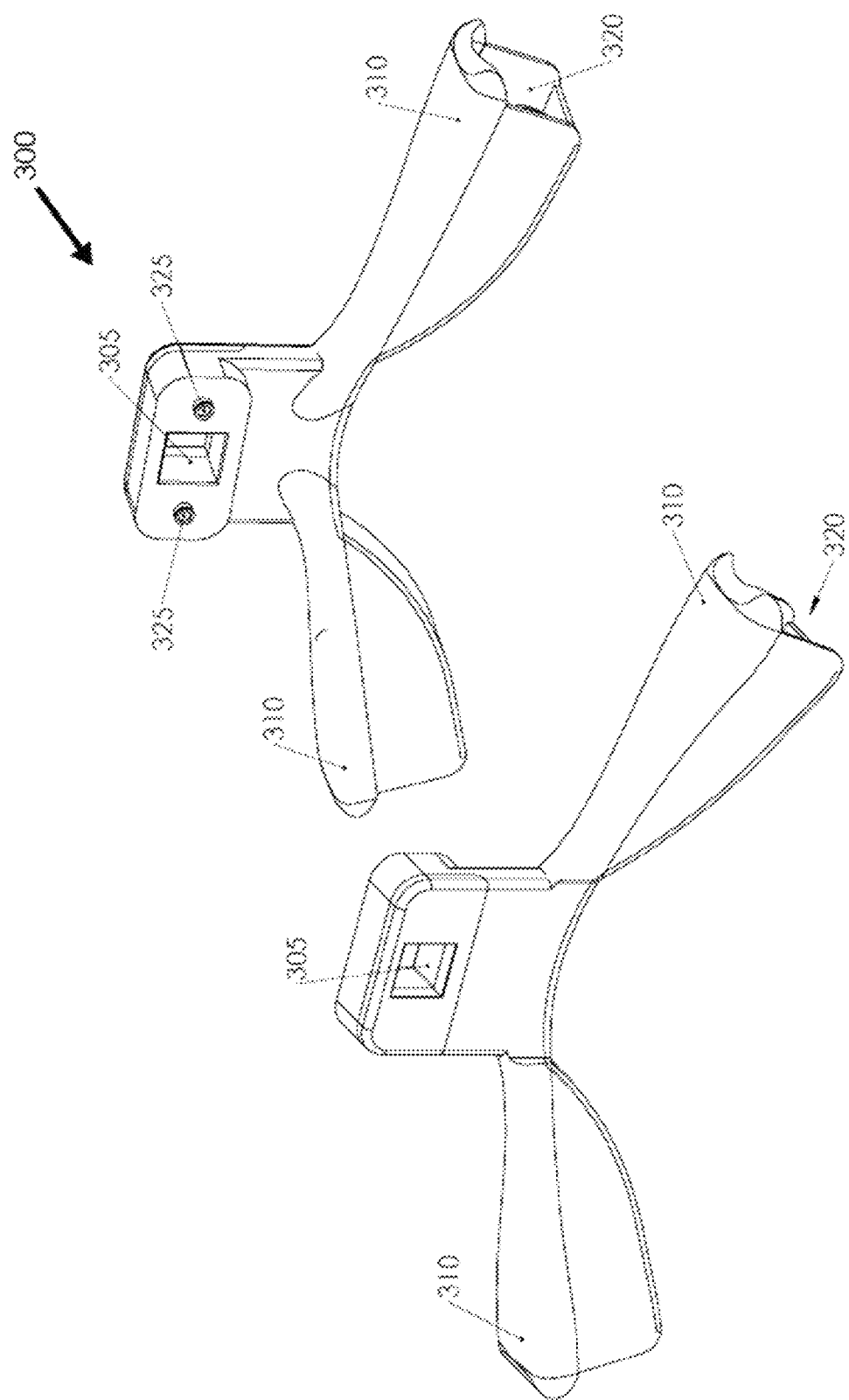
FIG. 3A depicts front and back views of hanger in an example embodiment.

FIG. 3A depicts front and back views of hanger 104 in an example embodiment. The front view of hanger 104 depicts mounting hole 305, hanger shoulders 310 and expandable component outlet 320.

Mounting hole 305 facilitates mounting of hanger 104 onto a mounting dock (depicted in FIG. 3C) which is connected to a sliding platform, the details of which are explained below with respect to FIG. 3C.

Hanger shoulders 310 facilitate hanging of garment 150. Hanger shoulders 310 contain expandable components (shown in FIG. 3B) underneath. The expandable components are in a compact state when sleeves 154 of garment 150 are initially hung from hanger shoulders 310. An actuator (not shown in FIGURES) may cause the expandable components to expand. The expandable components, when expanded, come out of expandable component outlets 320 (as shown in FIG. 3C), the details of which are explained below.

The actuator may cause the expandable components to expand by infusing a fluid into the expandable components. The flow of fluid into the expandable component may be controlled using an actuator. The actuator may operate to selectively inflate or deflate each of the expandable components. The expandable components, when in compact state, stay inside hanger 104. Hanger 104 may also comprise tubes connecting the actuator to the expandable components.

The actuator may use a feedback sensor (such as a pressure measuring valve) to determine when the expandable components are fully expanded (as the pressure rises when the expandable component expands against the fabric of garment 150) and fully retracted (when balloons are completely hidden from the user and pulled into the tubes).

In an example implementation, the expandable components are balloons, the fluid is air and the actuator is an air pumping device.

The back view of hanger 104 depicts valves 325 in addition to mounting hole 305, hanger shoulders 310, and expandable component outlets 320. Valves 325 control the flow of fluid into/out of expandable components placed underneath hanger shoulders 310.

Figure 3B:
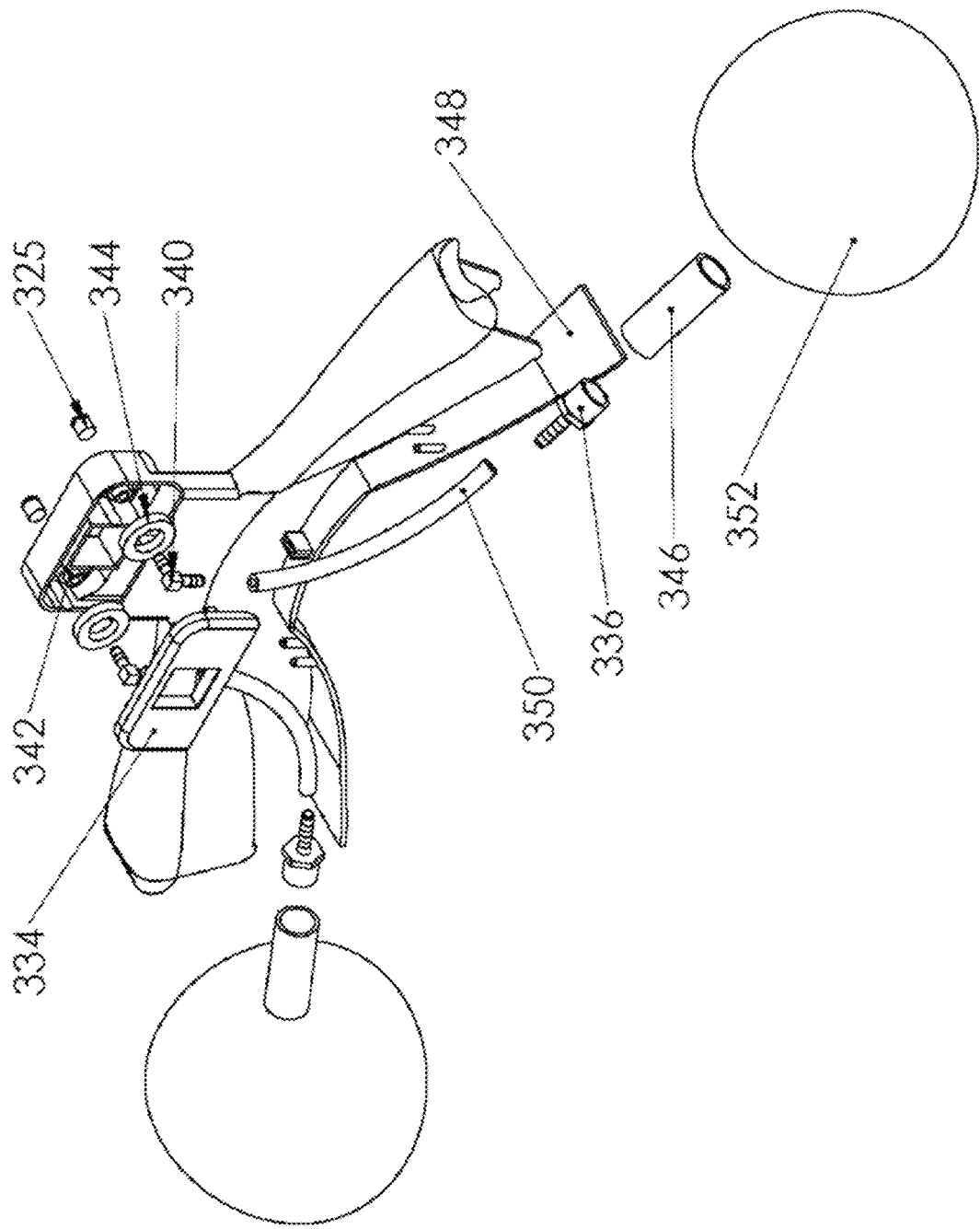
FIG. 3B depicts an exploded view of the structure of hanger in an example embodiment.

FIG. 3B depicts an exploded view of the structure of hanger 104 in an example embodiment. FIG. 3B is shown depicting hanger shell top cover 334, plastic orifice connection piece 336, valves 325, plastic elbow connection piece 340, fluid connection pipe 342, ring magnets 344, expandable component mounting pipe 346, hanger shell bottom cover 348, fluid hose 350, and expandable component 352.

Figure 3C:
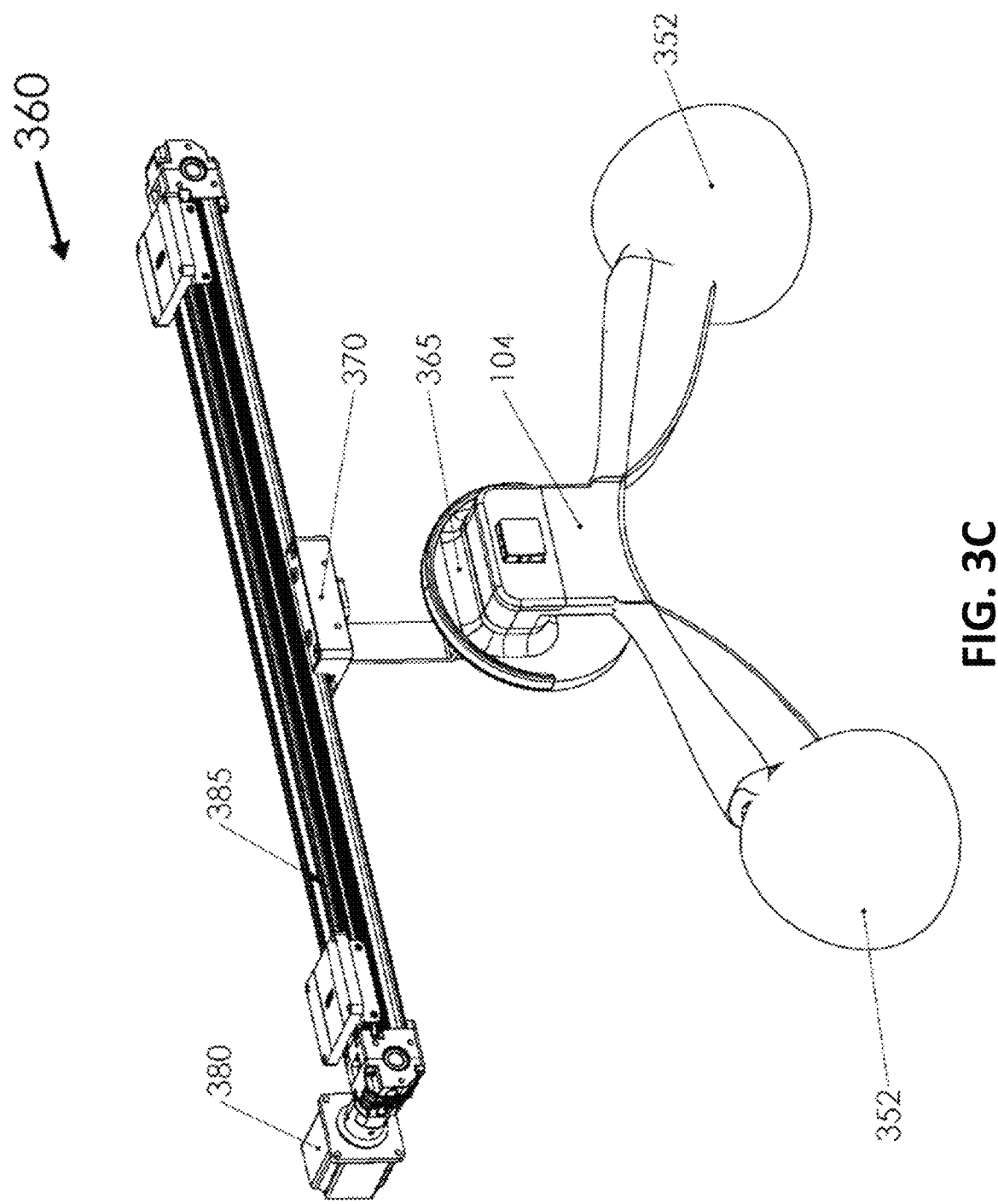
FIG. 3C depicts mechanism for linear sliding of hanger in an example embodiment.

Valves 325 connect hanger 104 to the actuator (that infuses fluid into expandable components) via mounting dock 365 (shown in FIG. 3C). When hanger 104 is mounted on mounting dock 365, valves 325 connect to a poking device on mounting dock 365 that opens valves 325 allowing fluid to freely flow between the actuator and expandable components 352 via valves 325, plastic elbow connection piece 340, fluid connection pipe 342, ring magnets 344, expandable component mounting pipe 346, and fluid hose 350. When hanger 104 is detached form mounting dock 365, valves 325 remain closed and prevent the fluid to flow out from or into expandable components 352.

FIG. 3C depicts mechanism for linear sliding of hanger 104 in an example embodiment. FIG. 3C is shown containing hanger 104 with expandable components 352 expanded, mounting dock/hanger dock 365, linear sliding platform 370, stepper motor 380 and linear movement timing belt module 385.

Stepper motor 380 and linear movement timing belt module 385 together cause the sliding of linear sliding platform 370. The operation of the combination of stepper motor 380 and linear movement timing belt module 385 to achieve linear movement of Linear sliding platform 370 is well known in the relevant art. Linear sliding platform 370 contains mounting dock/hanger dock 365 on which hanger 104 can be docked on to. When docked on to mounting dock 365, hanger 104 gets attached to linear sliding platform 370, thereby enabling sliding of hanger 104 (along with linear sliding platform 370) using the combination of stepper motor 380 and linear movement timing belt module 385.

Mounting dock 365 contains magnets for settling hanger 104 in the correct location. Valves 325 that make the connection from hanger 104 to the hanger docking station get pushed in by 2 poking devices that are located on mounting dock 365. This facilitates the flow of fluid (such as compressed air) to flow through the tubing into expandable components 352 (such as balloons). Expandable components 352 are situated in a location that allows sleeves 154 to be shut off from torso 152 (which will aid in the pressing of sleeves). Expandable components 352 aid in stretching the seam along underarm 160 of garment 150 causing wrinkles around underarms 160 and shoulders 158 to be removed. Expandable components 352 also block the passage between sleeves 154 and torso 152 of garment 150, enabling the steam to get trapped either inside sleeves 154, aiding in better pressing of sleeves 154, or in torso 152, aiding in better pressing of torso 152.

Figure 3D:
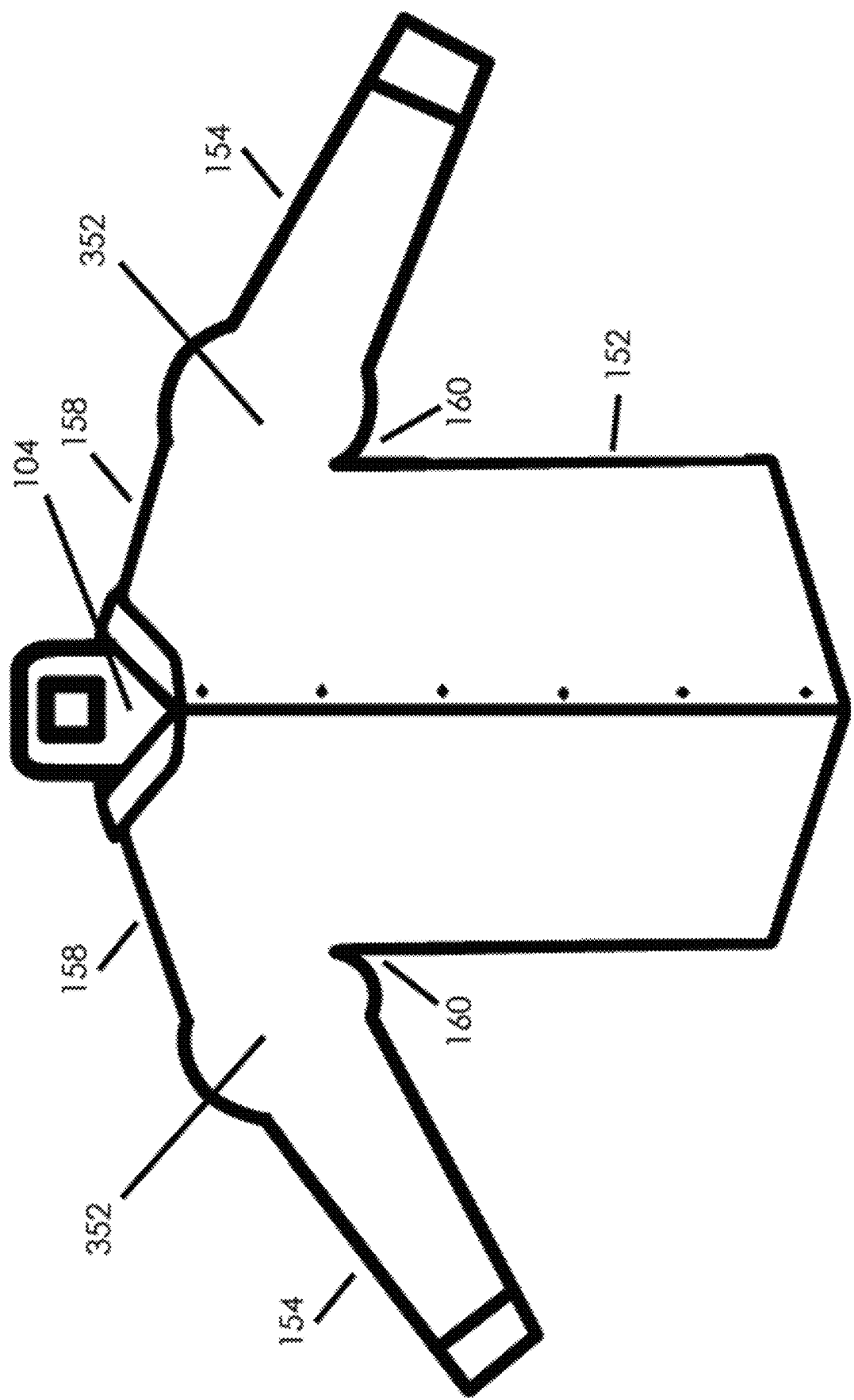
FIG. 3D depicts garment hanging on hanger with expandable components inflated in an example embodiment.

FIG. 3D depicts garment 150 hanging on hanger 104 with expandable components 352 inflated/expanded in an example embodiment. As may be readily observed from FIG. 3D, expandable components 352, when expanded/inflated, expand into sleeves 154 thereby closing the passage between sleeves 154 and torso 152 of garment 150 (i.e., by closing the gap between shoulders 158 and underarms 160 of garment 150).

When steam is blown into sleeves 154 with expandable components 352 expanded/inflated, expandable components 352 block the steam from escaping into torso 152 from sleeves 154 and the blocked steam removes wrinkles in sleeves 154.

The description is continued below with respect to sleeve grabber 106.

5. Sleeve Grabber

Figure 4A:
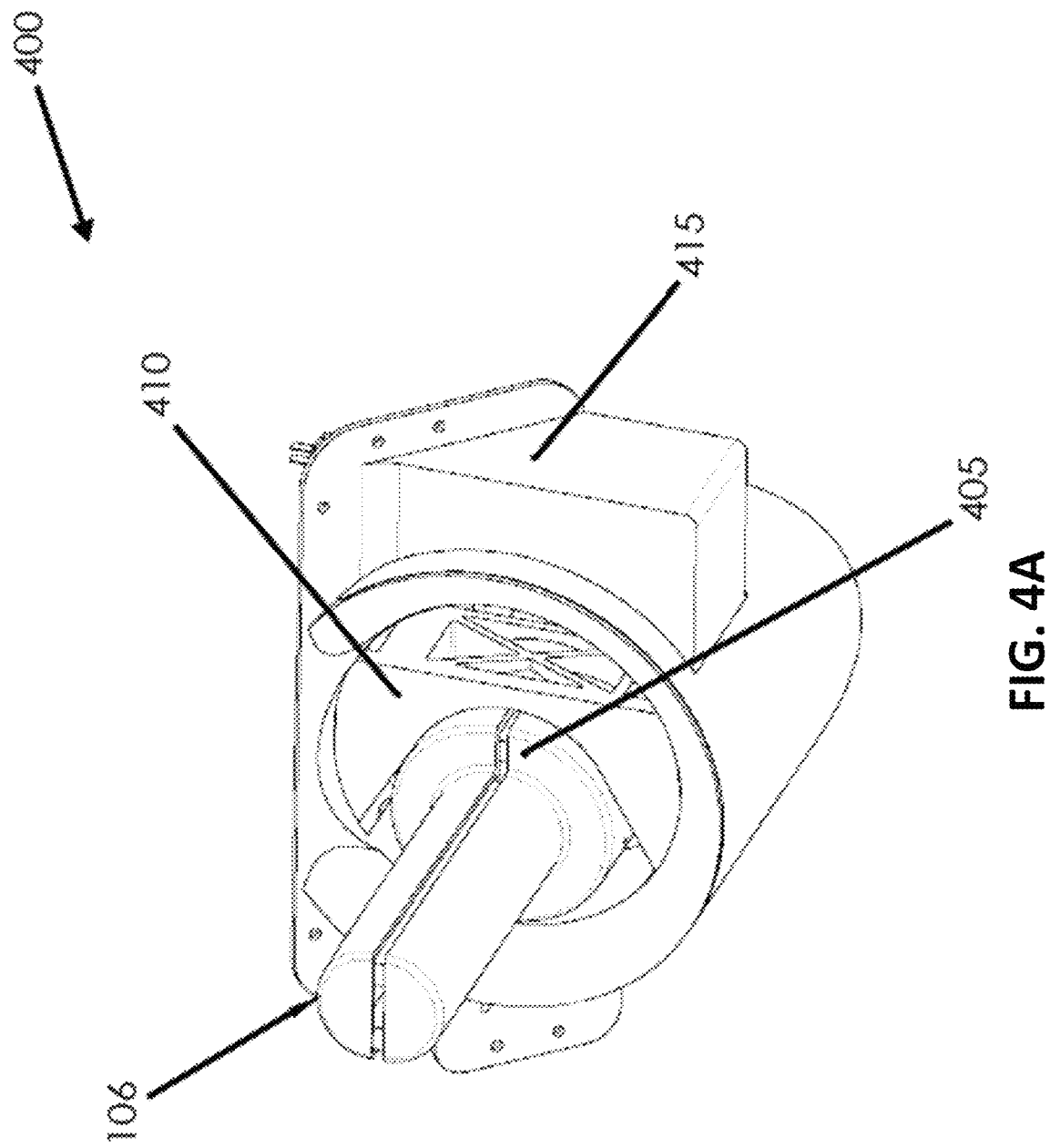
FIG. 4A depicts example implementation of sleeve grabber assembly containing sleeve grabber in contracted state.
Figure 4B:
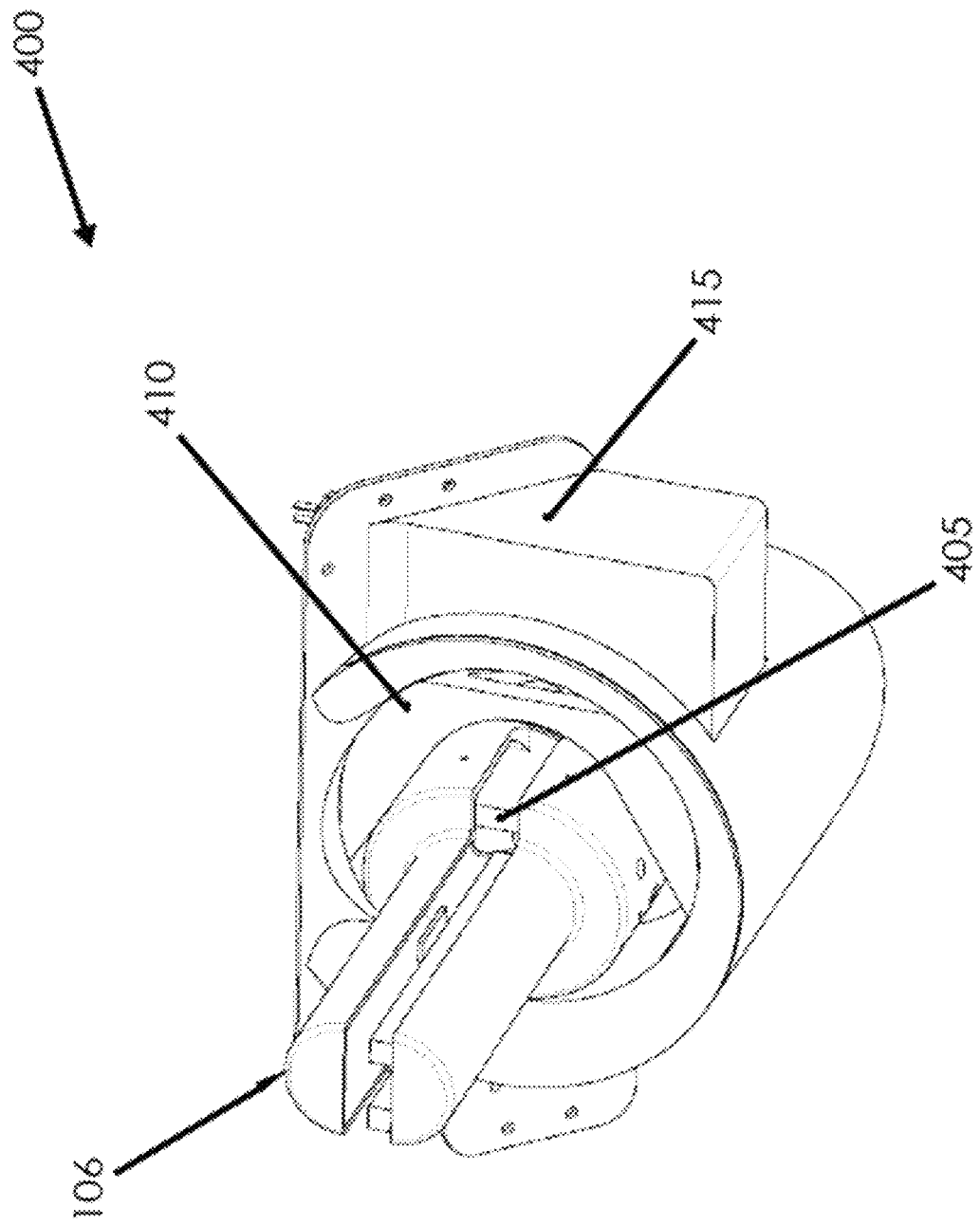
FIG. 4B depicts example implementation of sleeve grabber assembly containing sleeve grabber in expanded state.

FIGS. 4A and 4B depict example implementation of sleeve grabber assembly 400 containing sleeve grabber 106 in contracted state and expanded state respectively.

Sleeve grabber assembly 400 of FIG. 4A is shown containing sleeve grabber 106 with base 405, clamp 410 and holder 415. As may be readily observed from FIG. 4A (and as clearly labeled in FIG. 4C), sleeve grabber 106 consists of two sides. Sleeve grabber 106 contains expandable components (for example, springs) at base 405 (as shown in FIG. 4B). The expandable components exert force to push the two sides of sleeve grabber 106 apart. Clamp 410, when closed, keeps the two parts of sleeve grabber 106 together, thus maintaining sleeve grabber 106 in a contracted state. When clamp 410 is opened, the expandable components inside sleeve grabber 106 push the two sides of sleeve grabber 106 apart, thus resulting in an expanded state of sleeve grabber 106, as shown in FIG. 4B. It may be observed that FIG. 4B depicts expandable component 420.

However, in alternative embodiments, various other techniques may be employed to push the two sides of sleeve grabber 106 apart, with suitable modifications as will be apparent to a person skilled in the art.

In one alternative embodiment, the expandable component is a pneumatic balloon that would be expanded using a fluid to move the two sides of sleeve grabber 106 apart, after clamp 410 is opened.

In another alternative embodiment, sleeve grabber 106 does not contain any expandable component and the two parts of sleeve grabber 106 are moved apart using mechanical force generated by a motor and a mechanical gear assembly inside sleeve grabber 106.

Holder 415 houses a mechanical linear rail assembly that moves the clamp 410 linearly closing or opening the sleeve grabber 106.

Figure 4C:
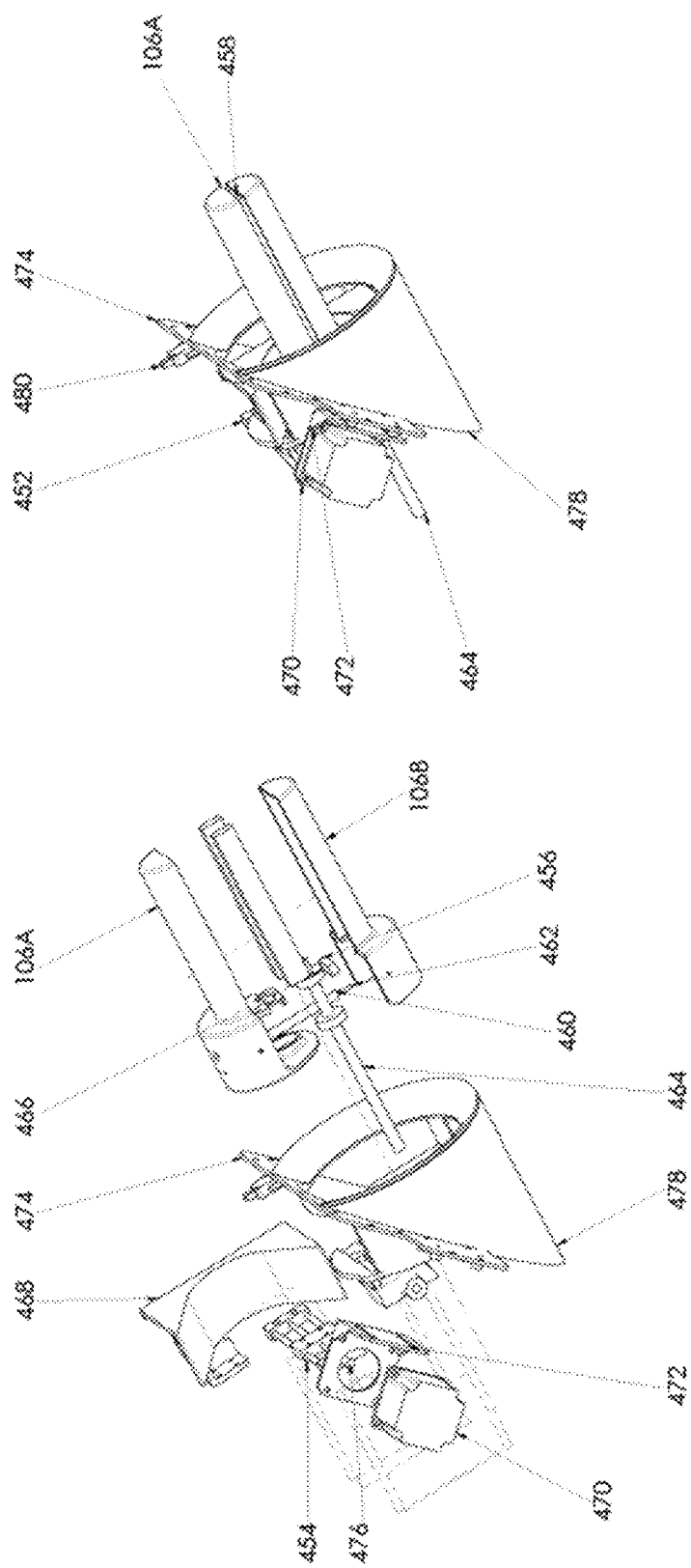
FIG. 4C depicts normal and exploded views of sleeve grabber assembly 400 in an example embodiment.

FIG. 4C depicts normal and exploded views of sleeve grabber assembly 400, in an example embodiment. FIG. 4C is shown depicting clip holder sliding rail 452, clip holder sliding platform 454, sleeve grabber side-A 106A, sleeve grabber side-B 106B, accordion short cover 456, accordion side covers 458, sliding piston inner rod 460, sliding piston body 462, steam tube 464, bearings 466, clip holder left claw 468, Nema 23 motor 470, motor bracket 472, clip holder base plate 474, shaft connector 476, clip holder cover 478, limit switch 480.

Sliding rail 452 is used to keep the sliding rail in place. Clip holder sliding platform 454 is the actual sliding rail. Sleeve grabber side-A 106A and side-B 106B are two sides of sleeve grabber 106. These two sides are used to grab/hold onto sleeves 154 of garment 150 from inside when they are in expanded state (i.e., when sides A and B are pushed apart).

Accordion short cover 456 and accordion side covers 458 are useful in containing the steam from leaking out of sleeve grabber 106 during grabbing mechanism.

Sliding piston inner rod 460 and sliding piston body 462 facilitate sliding of sleeve grabber side-A 106A and side-B 106B away and towards each other (with the help of the springs). Piston inner rod 460 goes inside the piston body 462. the piston body 462 goes over the Piston inner rod 460.

Steam tube 464 guides the pressurized steam from the steamer/boiler through sleeve grabber 106 (and the grabbing mechanism) into sleeves 154 of the garment 150.

Bearings 466 allow sleeve grabber 106 to rotate around its axis. This allows sleeves 154 to get unraveled/untwisted when put on twisted, so that when sleeves 154 are being ironed, no creases get developed.

Clip holder left claw 468 presses and releases sleeve grabber 106 open/closed as the sliding rail 452 pushes it back and forth. This makes sleeve grabber 106 get a hold/or release the sleeves of the garment.

Nema 23 motor 470 drives the rail system back and forth (to move clip holder). Motor bracket 472 attaches Nema 23 motor 470 to clip holder base plate 474. Shaft connector 476 connects the Nema 23 motor 470 to the clip holder sliding platform 454 enabling it to move linearly The limit switch 480 limits the movement of the clip holder sliding platform 454 and by sending a signal back to the controller. Clip holder cover 478 covers the mechanism from an outside view. Limit switch 480 facilitates a point of reference for the rail system.

Though not shown in the figures, sleeve grabber assembly 400 also contains a retractable cable connecting sleeve grabber 106 to a retractable box.

In an example embodiment, sleeve grabber 106 is placed/inserted into sleeve 154 from sleeve edge 156 and then clamp 410 is opened. Upon opening of clamp 410, expandable components (springs) inside sleeve grabber 106 (at base 405) exert force on the two sides of sleeve grabber 106 (i.e., side-A 106A and side-B 106B) and push them apart (to expand), as shown in FIG. 4B. When the two sides of sleeve grabber 106 are pushed apart/expanded, they grab/hold sleeve 154 of garment 150.

The expandable component (balloon) on one side (for example, right side) is selectively expanded/inflated. The inflated balloon closes the passage between the right sleeve and torso 152 of garment 150.

Then hanger 104 is moved in the direction opposite to the side on which the balloon is inflated (i.e., left side) by moving linear sliding platform 370 using the combination of stepper motor 380 and linear movement timing belt module 385, which results in pulling sleeve grabber 106 on the right side out of holder 415. With this, sleeve grabber 106 experiences two opposing forces, one from garment 150 pulling sleeve grabber 106 out of holder 415, and another from the retractable cable that is pulling sleeve grabber 106 back into holder 415. These two opposing forces result in stretching the right sleeve of garment 150 along the length of the sleeve. Also, bearings 466 allow sleeve grabber 106 to rotate around its axis which allows right sleeve of garment 150 to get unraveled/untwisted automatically. The stretching and untwisting also result in de-wrinkling of garment.

If the steam is blown into the right sleeve with the balloon on the right side inflated, the inflated balloon blocks the steam from escaping into torso 152 of garment 150, thereby forcing the steam to inflate the sleeve completely, stretching out all the wrinkles, and then to escape/infuse through the fabric of the right sleeve. This leads to removal of wrinkles in the right sleeve.

The same process can be repeated for de-wrinkling the left sleeve. Hanger 104 is brought back to the center and the steam is applied to torso 152 of garment through steam nozzle 110 for a few minutes.

In an alternative example embodiment, hanger 104 is first moved in one direction and then the balloon in the opposite direction is made to inflate.

The description is continued below with respect to drying unit 215.

6. Drying Unit

Figure 5:
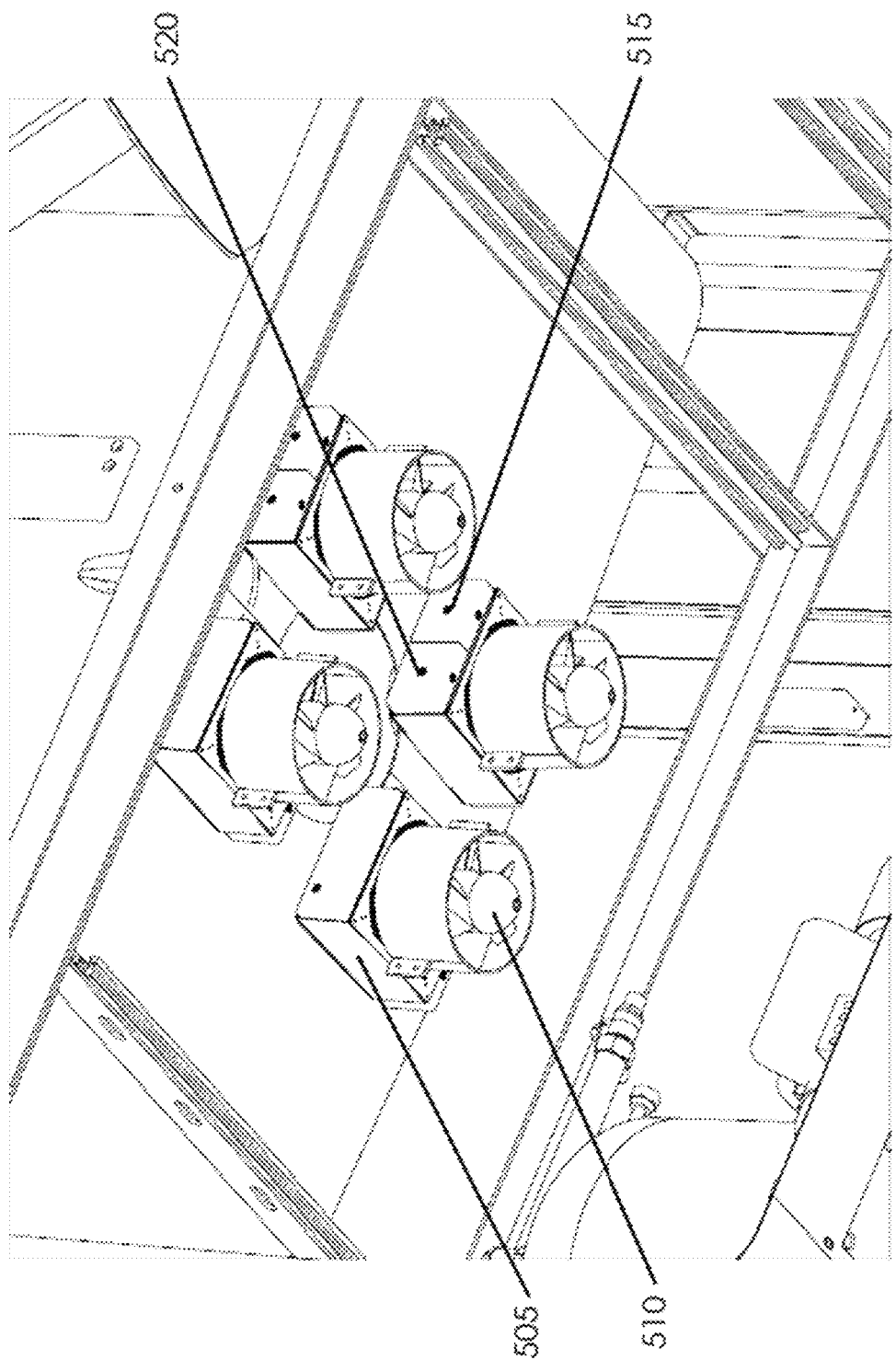
FIG. 5 depicts drying unit in an embodiment of the present disclosure.

FIG. 5 depicts drying unit 215 in an embodiment of the present disclosure. FIG. 5 is shown containing 4 dryers, each dryer containing heat exchanger 505, inlet ducted fan 510, steam inlet 515 and steam outlet 520.

Heat exchanger 505 facilitates transfer of heat between steam and air.

Inlet ducted fan 510 propels air through heat exchanger 505 and the air gets heated when it flows through heat exchanger 505. Inlet ducted fan 510 also facilitates blowing the hot air into garment 150 via dryer nozzles 112, as the air propelled through heat exchanger 505 pushes out the hot air. In alternative embodiments, the dryer may employ various mechanisms for collecting the hot air from heat exchanger 505 and for directing the hot air into garment 150 via dryer nozzles 112. Though not shown in the FIGURE, heat exchanger 505 may employ suitable techniques (such as solid walls) to prevent mixing of the steam and the air.

Steam inlet 515 facilitates injection of steam into heat exchanger 505 from the steamer in steam generator assembly 114. The steam generated in the steamer meant for cleaning and ironing processes is redirected to heat exchanger 505 for generating hot air that is used for drying process. Upon heat exchange in heat exchanger 505, the steam may get condensed into water.

Steam outlet 540 facilitates redirection of the steam coming out of heat exchanger back to the steamer or to steam nozzle 110. Also, steam outlet 540 facilitates redirection of water formed due to condensation back to the steamer.

Thus, the existing stored heat energy in the form of steam in the steamer is used to create the heat required for generating hot air by redirecting the steam through heat exchanger 505. This results in less power consumption and thereby making laundry apparatus 100 more energy efficient.

Though 4 dryers are shown in FIG. 5, more or a smaller number of dryers may be employed based on the requirement.

Furthermore, though FIG. 5 depicts heat exchange between the steam and the air in heat exchanger 505, heat exchanger 505 may suitably be adapted to facilitate heat exchange between any fluids (for example, between hot water from the steamer and the air, or between the steam from the steamer and any other gas propelled by inlet ducted fan 510) as will be readily apparent to a person skilled in the art.

The description is continued below with respect to steam nozzle 110.

7. Steam Nozzle/Outlet

Steam nozzle 110 in laundry apparatus 100 is the main outlet for pressurized steam and cleaning liquids that aid in the laundering processes of garment 150. According to an aspect of the present invention, steam nozzle 110 has two axes of movement, thereby enabling movement in a spherical plane.

Figure 6:
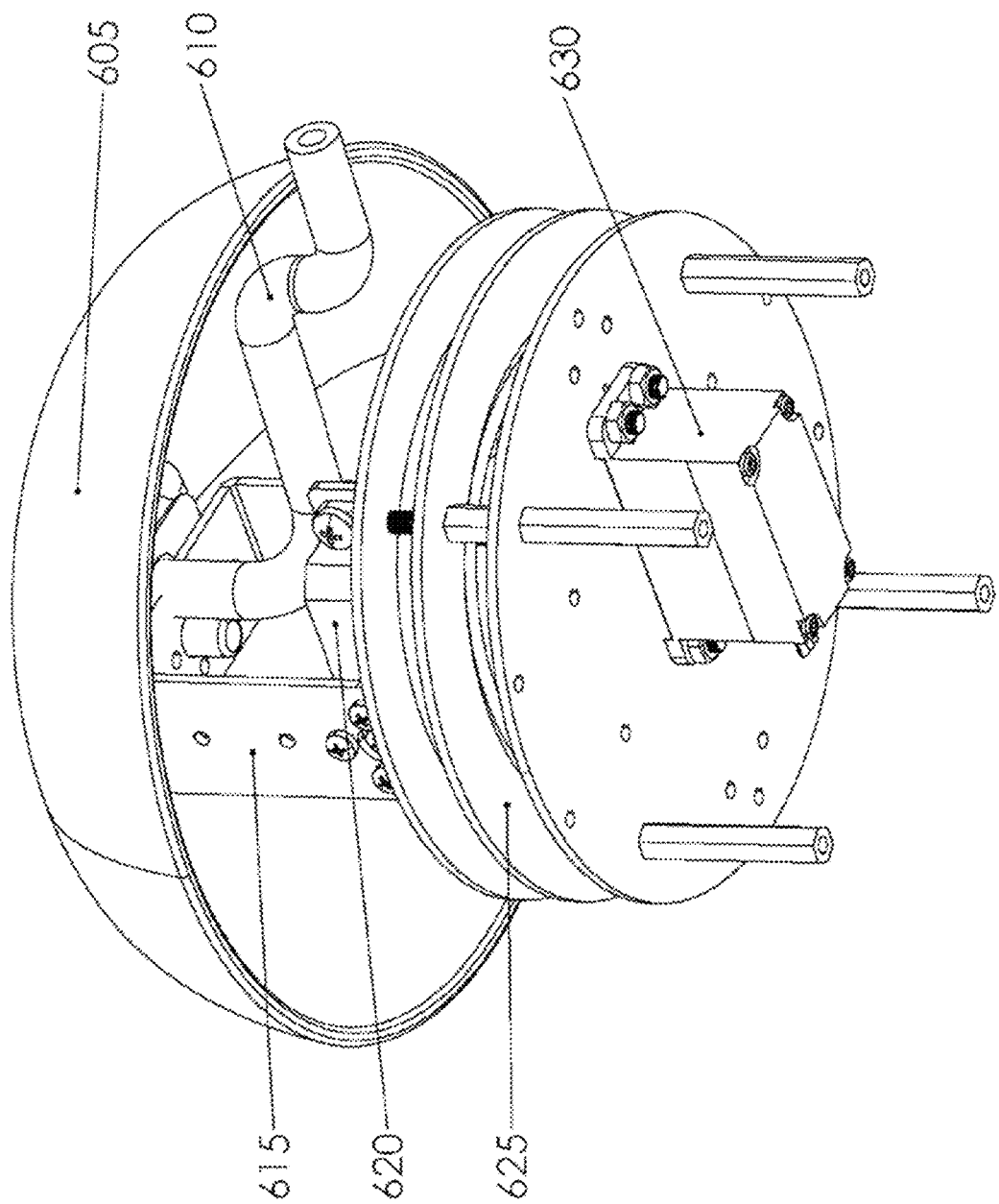
FIG. 6 depicts steam nozzle in an embodiment of the present disclosure.

FIG. 6 depicts steam nozzle 110 in an embodiment of the present disclosure. FIG. 6 is shown containing top cover shell 605, steam hose 610, swivel mounting bracket 615, top servo 620, servo mounting base 625 and bottom servo 630. The two-servo assembly as depicted in FIG. 6 enables steam nozzle 110 to move in a spherical plane. This allows directing steam and liquid in any direction. Top cover shell 605 shields the servos (servo motors) from water damage. Also, top cover shell 605 provides for aesthetics. Steam hose 610 provides the steam to be directed towards garment 150. Swivel mounting bracket 615 connects top servo 620 to top cover shell 605 enabling top servo 620 to turn top cover shell 605 in clockwise or anti-clockwise direction. Servo mounting base 625 connects bottom servo 630 to top servo 620 enabling bottom servo to turn top servo 620 in clockwise or anti-clockwise direction.

The description is continued below with respect to automation of the process of attaching clips 108 to garment 150.

8. Automated Clips

Figure 7A:
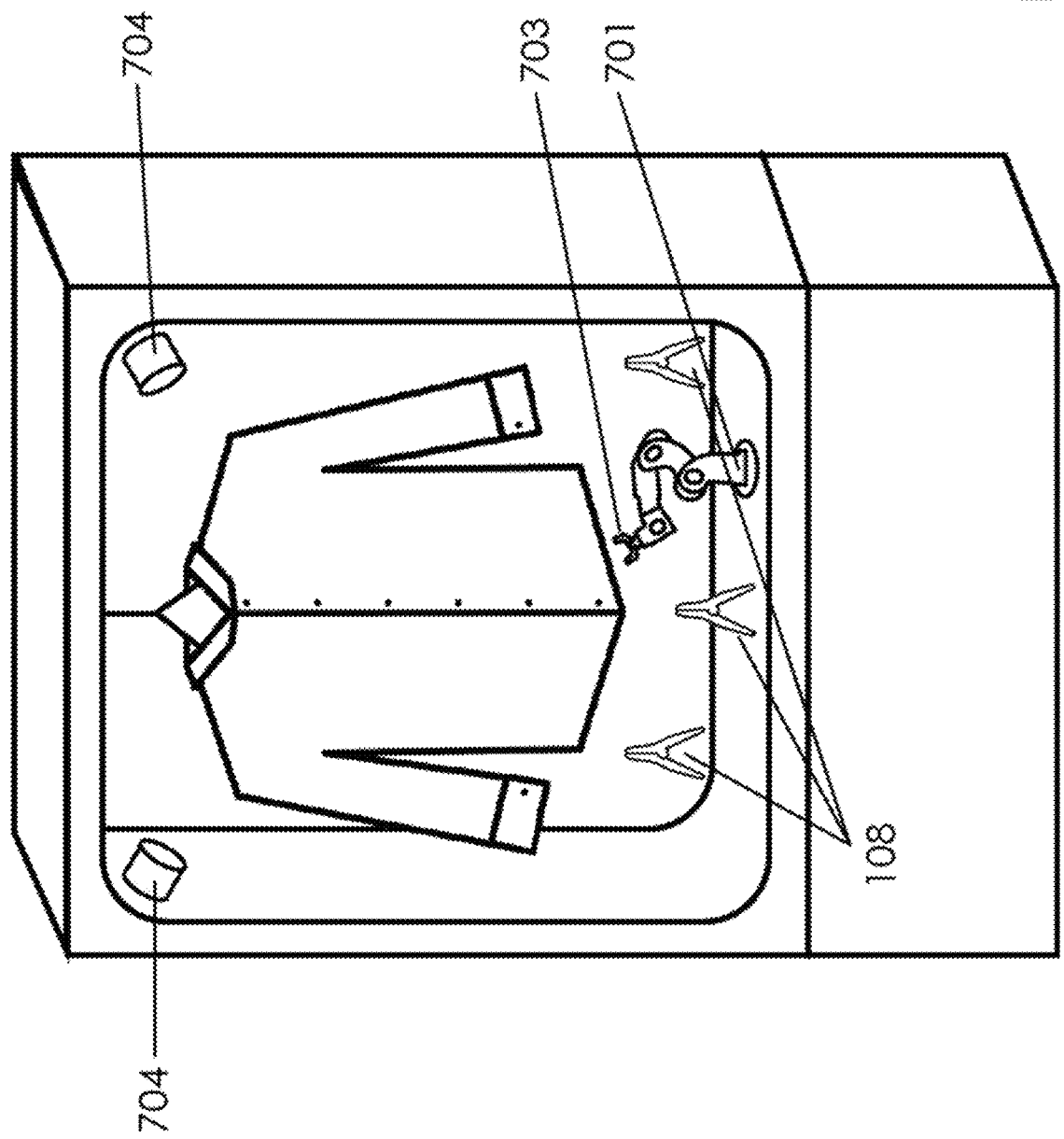
FIGS. 7A and 7B depict automation of the process of attaching clips at seams (or at any other points) of garment, in an embodiment of the present disclosure.
Figure 7B:
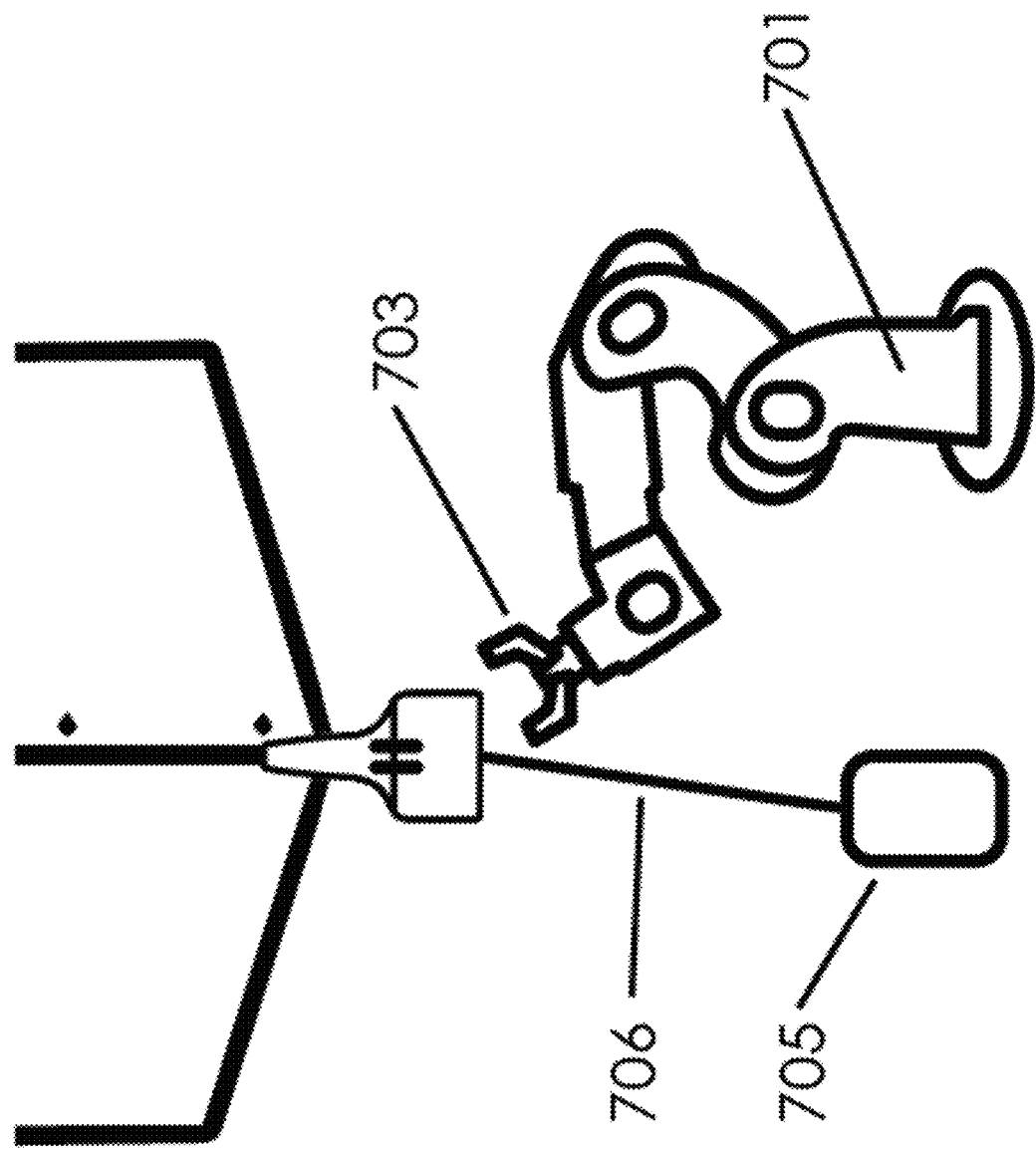

FIGS. 7A and 7B depict automation of the process of attaching clips 108 at seams 162 (or at any other points) of garment 150 in an embodiment of the present disclosure. FIG. 7A is shown containing robotic arm 701, clips 108, end effector 703 and cameras 704.

Robotic arm 701 attaches clips 108 on garment 150. In an example implementation, robotic arm 701 has 6 degrees of freedom. However, robotic arm 701 with other degrees of freedom may also be used. Robotic arm 701 has an end effector 703 that that aids in attaching clips 108 by compressing them into open position.

Cameras 704 are used to visualize garment 150 by taking images and/or videos. The images or videos taken by cameras 704 are processed by one or more processors (not shown in the FIGURE) connected to cameras 704.

The processing involves use of various image processing algorithms to recognize the points at which clips 108 need to be attached in garment 150. The one or more processors may be connected to machine readable media. The one or more processors may perform image processing techniques based on appropriate instructions stored on a non-volatile machine-readable medium such as a non-volatile ROM. The one or more processors may also contain main memory (such as RAM).

The image processing techniques used by the processor may include use of edge detection algorithms and pattern recognition algorithms. Also, the processor may use Infrared lighting illumination technique that illuminates garment 150 based on difference in thickness. The thicker the fabric, the darker the color registered by cameras 704. Using an array of infrared lights, the edge detection algorithm will be able to clearly recognize seams 162 of garment 150 since seams 162 typically have multiple layers of fabric and extra threading/stitches. Robotic arm 701 can then be guided by a 3D manipulation and reverse kinematics algorithm to correctly attach clips 108 to garment 150.

Above noted image processing techniques may also be used to identify wrinkles in garment 150 as clips 108 are attached and retractable cables 706 attached to clips 108, stretch the garment. As cameras 704 record data of how the clip positions and attachments affect the wrinkles, the data is fed into a machine learning model that, with enough data, will be able to optimize the positioning and attachment of clips 108 for all types of garments, thereby improving the quality of ironing as more and more garments subjected to laundering processes using laundry apparatus 100.

The processor calculates the position and angle at which clips 108 need to be attached based on image processing techniques explained above, and calculates the trajectory of robotic arm 701 to place the clips at determined positions on garment 150.

FIG. 7B depicts further details of the process of attaching clips 108 in an embodiment of the present disclosure. FIG. 7B depicts clips 108 as being connected to retractable cable box 705 via retractable cable 706. Clips 108 are pulled down by retractable cable 706, thus pulling garment 150 at the points of attachment. The pull stretches garment 150, thereby aiding in in better application of laundering processes and also removal of wrinkles.

9. Example Illustration

A user begins using the kiosk (laundry apparatus 100) by first clicking on the start button of user interface 120 which is a touchscreen user interface. User interface 120 then guides the user on how to operate the kiosk and set up garment 150 for laundering processes step-by-step.

The user takes garment 150 and hangs it on hanger 104 and then attaches hanger 104 to mounting dock/hanger dock 365. At this stage, balloons 352 (expandable components 352) in hanger 104 are hidden from the user. As the user attaches hanger 104, the poking devices open valves 325 on hanger 104, enabling balloons 352 on hanger 104 to be inflated or deflated by the air pumping device (the actuator). The user closes door 118. The air pumping device uses air pressure measuring valve as a feedback sensor to determine when balloons 352 are fully expanded (as the pressure rises when the balloon expands against the fabric of the garment) and fully retracted (when balloons are completely hidden from the user and pulled into the air tubes).

Robotic arm 701 attaches clips 108 (which are connected to retractable box 705 through retractable cables 706) on garment 150 at seams 162 or at any other places. Due to the pulling force of retractable cables 706, clips 108 exert pulling force that stretch garment 150. In the stretched position, the most effective way to remove wrinkles is to use high pressure steam (~4 bars) and steam garment 150 in circular patterns so that the force of the steam stretches out wrinkles in all orientations.

Laundering process starts with steam nozzle 110 by first turning on the steam and directing the flow towards drainage (or through the heat exchangers that eventually go into drainage) to take out any water in the line.

Steam nozzle 110 directs the steam towards torso 152 for about 30 seconds while sleeve grabbers 106 are expanded to grab sleeves 154 through sleeve edges 156. The actuator selectively inflates one of balloons 352 in hanger 104 thereby making the balloon expand into the corresponding sleeve.

Then hanger 104 is moved in the direction opposite to the side on which the balloon is inflated. As hanger 104 moves, sleeve grabber 106 from the opposite side is pulled out of holder 415. As the sleeve grabber is pulled out of holder 415, entire sleeve grabber 106 rotates along the axis of sleeve grabber 106 (generally, the axis of the steam tube), effectively automatically untwisting the sleeves. The automatic untwisting functionality is a passive design not requiring any sensors and automatically fixing the orientation of the sleeve before steaming. This is possible because of the entire sleeve grabber assembly has a center of mass located at the central steam tube that becomes the axis of rotation. The bearings around the steam tube allow free circular movement of the sleeve grabber around the steam tube. With this, sleeve grabber 106 experiences two opposing forces, one from garment 150 pulling sleeve grabber 106 out of holder 415, and another from the retractable cable that is pulling sleeve grabber 106 back into holder 415. These two opposing forces result in stretching the sleeve of garment 150 opposing forces stretch the sleeve along the length of the sleeve stretching thereby removing wrinkles. When the steam is blown into the sleeve, the inflated balloon blocks the steam from escaping into torso 152 of garment 150, thereby forcing the steam is to inflate the sleeve completely, stretching out all the wrinkles, and then to escape/infuse through the fabric of the sleeve. This results in removal of wrinkles in the sleeve.

As one of the sleeves is being steamed, the balloon on the other side is inflated and hanger 104 moves to the other side when ironing of one sleeve is completed.

Once the sleeves are steamed, the torso is steamed again for 30 seconds to a minute. The ironing process may also involve directing cleaning liquids towards garment 150 by injecting the cleaning liquids into the steam tubing to clean garment 150.

Finally, the garment is dried using drying unit 215 containing heat exchangers 505 and inlet ducted fans 510. A feedback humidity or moisture sensor can ensure that the drying cycle is long enough that the garment is dried. The hot air is aimed at strategic parts of the garment (the bottom front and bottom back of the torso), that typically get more wet due to close proximity to the torso steam nozzle. During the drying cycle, the balloons are vacuumed/hidden and sleeve grabbers are closed back up so the garment can be easily removed by the user when the cycle is finished.

10. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

What is claimed is:

1. A laundry kiosk comprising:
   a chamber;
   a hanger arranged within the chamber and configured to receive a garment;
   a first sleeve retainer:
      arranged:
         below the hanger; and
         proximal a first side of the chamber; and
      configured to:
         retain a first sleeve of the garment; and
         tension the first sleeve against the hanger;
   a second sleeve retainer:
      arranged:
         below the hanger; and
         proximal a second side of the chamber opposite the first side of the chamber;
      configured to:
         retain a second sleeve of the garment; and
         tension the second sleeve against the hanger; and
   a steam nozzle:
      interposed between the first sleeve retainer and the second sleeve retainer;
      configured to expel a first steam jet toward an interior surface of the garment to tension local areas of a torso of the garment.

2. The laundry kiosk of claim 1, further comprising:
   a steam generator configured to deliver steam to the steam nozzle; and
   an actuator configured to rotate the steam nozzle in a circular motion about two axes to sweep the first steam jet across the interior surface of the garment.

3. The laundry kiosk of claim 1, further comprising:
   a steam generator configured to deliver steam to the steam nozzle; and
   an actuator configured to:
      advance the steam nozzle upwardly within the garment and along a vertical axis; and
      rotate the steam nozzle about the vertical axis to sweep the first steam jet across the interior surface of the garment.

4. The laundry kiosk of claim 1, further comprising a set of clips, each clip in the set of clips:
   coupled to a base of the chamber via a retractable cable; and
   configured to:
      transiently couple to a bottom edge of the garment; and
      tension the torso of the garment against the hanger.

5. The laundry kiosk of claim 1:
   wherein the hanger comprises:
      a first wing extending toward the first side of the chamber; and
      a second wing extending toward the second side of the chamber; and further comprising:
  a first expandable component:
    arranged on the first wing of the hanger; and
    configured to expand within the first sleeve of the garment arranged on the hanger to block passage of steam between the torso of the garment and the first sleeve; and
  a second expandable component:
    arranged on the second wing of the hanger; and
    configured to expand within the second sleeve of the garment to block passage of steam between the torso of the garment and the second sleeve.

6. The laundry kiosk of claim 1, further comprising:
a second steam nozzle:
  arranged on the first sleeve retainer; and
  configured to expel a second steam jet within the first sleeve of the garment to tension local areas of the first sleeve of the garment; and
a third steam nozzle:
  arranged on the second sleeve retainer; and
  configured to expel a third steam jet within the second sleeve of the garment to tension local areas of the second sleeve of the garment.

7. The laundry kiosk of claim 1, further comprising:
a steam generator configured to supply steam to the steam nozzle;
an air inlet arranged on the chamber;
a heat exchanger:
  interposed between the steam generator and the steam nozzle; and
  configured to transfer energy from steam, generated by the steam generator, to air entering the chamber via the air inlet; and
a set of dryer nozzles:
  arranged within the chamber; and
  configured to direct air from the heat exchanger toward the garment to dry the garment.

8. The laundry kiosk of claim 1, further comprising a linear sliding platform:
  supporting the hanger within the chamber;
  extending laterally between the first sleeve retainer and the second sleeve retainer; and
  configured to:
    traverse the hanger toward the second sleeve retainer to tension the first sleeve of the garment between the first sleeve retainer and the hanger; and
    traverse the hanger toward the first sleeve retainer to tension the second sleeve of the garment between the second sleeve retainer and the hanger.

9. The laundry kiosk of claim 8, wherein the hanger is configured to magnetically couple to the linear sliding platform.

10. A laundry kiosk comprising:
a chamber;
a hanger arranged within the chamber and configured to receive a garment, the hanger comprising:
  a center section;
  a first wing extending from the center section; and
  a second wing extending from the center section opposite the first wing;
a first expandable component:
  arranged on the first wing of the hanger; and
  configured to:
    expand into a first sleeve of the garment arranged on the hanger; and
    block passage of steam from inside a torso of the garment into the first sleeve of the garment; and
a second expandable component:
  arranged on the second wing of the hanger; and
  configured to:
    expand into a second sleeve of the garment; and
    block passage of steam from inside the torso of the garment into the second sleeve of the garment.

11. The laundry kiosk of claim 10, further comprising a set of clips arranged below the hanger, each clip in the set of clips:
  coupled to a base of the chamber via a retractable cable; and
  configured to:
    transiently couple to a bottom edge of the garment; and
    tension the garment against the hanger.

12. The laundry kiosk of claim 10, further comprising:
a steam nozzle:
  arranged below the hanger; and
  configured to expel a first steam jet along a nozzle axis and toward an interior surface of the garment to tension a local area of the garment; and
an actuator configured to traverse the steam nozzle across the interior surface of the garment.

13. The laundry kiosk of claim 12, further comprising:
a steam generator configured to supply steam to the steam nozzle;
an air inlet arranged on the chamber;
a drying assembly comprising:
  a heat exchanger configured to:
    transfer energy from steam, generated by the steam generator, to air entering the chamber via the air inlet; and
  a set of dryer nozzles:
    arranged within the chamber; and
    configured to direct the air from the heat exchanger toward the garment to dry the garment.

14. The laundry kiosk of claim 10, further comprising:
a first sleeve retainer:
  arranged:
    below the hanger; and
    proximal a first side of the chamber; and
  configured to:
    clamp the first sleeve of the garment; and
    tension the first sleeve of the garment against the hanger;
a second sleeve retainer:
  arranged:
    below the hanger; and
    proximal a second side of the chamber; and
  configured to:
    clamp the second sleeve of the garment; and
    tension the second sleeve of the garment against the hanger.

15. The laundry kiosk of claim 14, further comprising:
a second steam nozzle:
  arranged on the first sleeve retainer; and
  configured to expel a second steam jet within the first sleeve of the garment to release wrinkles within the first sleeve of the garment; and
a third steam nozzle:
  arranged on the second sleeve retainer; and
  configured to expel a third steam jet within the second sleeve of the garment to release wrinkles within the second sleeve of the garment.

16. The laundry kiosk of claim 14, further comprising a linear sliding platform:
  supporting the hanger within the chamber;
  extending laterally toward the first sleeve retainer and the second sleeve retainer; and
  configured to:
    traverse the hanger toward the second sleeve retainer to tension the first sleeve of the garment between the first sleeve retainer and the hanger; and
    traverse the hanger toward the first sleeve retainer to tension the second sleeve of the garment between the second sleeve retainer and the hanger.

17. A laundry kiosk comprising:
  a chamber;
  a hanger arranged within the chamber and configured to receive a garment;
  a first sleeve retainer:
    arranged:
      below the hanger; and
      proximal a first side of the chamber; and
    configured to:
      retain a first sleeve of the garment; and
      tension the first sleeve of the garment against the hanger;
  a second sleeve retainer:
    arranged:
      below the hanger; and
      proximal a second side of the chamber;
    configured to:
      retain a second sleeve of the garment; and
      tension the first sleeve of the garment against the hanger; and
  a set of clips arranged below the hanger, each clip in the set of clips:
    coupled to a base of the chamber via a retractable cable; and
    configured to:
      transiently couple to a bottom edge of the garment; and
      tension the garment against the hanger.

18. The laundry kiosk of claim 17:
  wherein the hanger comprises:
    a first wing extending toward the first side of the chamber; and
    a second wing extending toward the second side of the chamber; and
  further comprising:
    a first expandable component:
      arranged on the first wing of the hanger; and
      configured to expand within the first sleeve of the garment arranged on the hanger to block passage of steam between a torso of the garment and the first sleeve; and
    a second expandable component:
      arranged on the second wing of the hanger; and
      configured to expand within the second sleeve of the garment to block passage of steam between the torso of the garment and the second sleeve.

19. The laundry kiosk of claim 17, further comprising:
  a steam nozzle:
    interposed between the first sleeve retainer and the second sleeve retainer;
    configured to expel a first steam jet toward an interior surface of the garment to release wrinkles within a torso of the garment; and
  an actuator configured to traverse the steam nozzle across the interior surface of the garment.

20. The laundry kiosk of claim 17, further comprising:
  a second steam nozzle:
    arranged on the first sleeve retainer; and
    configured to expel a second steam jet within the first sleeve of the garment to release wrinkles within the first sleeve of the garment; and
  a third steam nozzle:
    arranged on the second sleeve retainer; and
    configured to expel a third steam jet within the second sleeve of the garment to release wrinkles within the second sleeve of the garment.

* * * * *